US008531354B2

(12) United States Patent
Woodard (10) Patent No.: US 8,531,354 B2
(45) Date of Patent: Sep. 10, 2013

(54) IMAGE GENERATION SYSTEM

(76) Inventor: William Bryan Woodard, Christchurch (NZ)

(*) Notice: Subject to any disclaimer, the term of this patent is extended or adjusted under 35 U.S.C. 154(b) by 816 days.

(21) Appl. No.: 12/703,954

(22) Filed: Feb. 11, 2010

(65) Prior Publication Data
US 2010/0207877 A1     Aug. 19, 2010

Related U.S. Application Data

(63) Continuation of application No. PCT/NZ2008/000212, filed on Aug. 15, 2008.

(30) Foreign Application Priority Data

Aug. 15, 2007 (NZ) .......................... 560457

(51) Int. Cl.
*G09G 5/00* (2006.01)
(52) U.S. Cl.
USPC .................................. 345/8; 345/7
(58) Field of Classification Search
USPC .......................................... 345/7–9
See application file for complete search history.

(56) References Cited

U.S. PATENT DOCUMENTS

| | | | |
|---|---|---|---|
| 5,751,260 A | 5/1998 | Nappi et al. | |
| 6,252,989 B1 | 6/2001 | Geisler et al. | |
| 6,526,159 B1* | 2/2003 | Nickerson | 382/117 |
| 6,637,883 B1 | 10/2003 | Tengshe et al. | |
| 6,798,443 B1* | 9/2004 | Maguire, Jr. | 348/121 |
| 8,298,078 B2* | 10/2012 | Sutton et al. | 463/29 |

FOREIGN PATENT DOCUMENTS

WO    2007037751 A1    4/2007

OTHER PUBLICATIONS

International Search Report, PCT/NZ2008/000212, Nov. 5, 2008.
International Preliminary Examining Authority, PCT/NZ2008,000212, Written Opinion of the International Preliminary Examining Authority, Sep. 15, 2009.
International Preliminary Report on Patentability, PCT/NZ2008000212, Nov. 17, 2009.
Hornof et al., "EyeDraw: A System for Drawing Pictures with Eye Movements", ACM SIGACCESS Accessibility and Computing, Sep. 2003, Issue 77-78, pp. 86-93.

* cited by examiner

*Primary Examiner* — Duc Dinh
(74) *Attorney, Agent, or Firm* — Cantor Colburn LLP (57) ABSTRACT

An image generation system for generating an image on a display screen. The image generation system includes an eye-tracking system capable of determining a user's eye orientation and outputting a signal indicative of same. The image generation system also includes a bio-feedback sensor capable of detecting activity of one or more physiological functions of the user and outputting a signal indicative of the level of activity. A processor is included and is adapted to receive and process the output signals from the eye-tracking system and bio-feedback sensor. The processor determines an image to be generated on the display screen indicative of the signals from the eye-tracking system and bio-feedback sensor.

31 Claims, 7 Drawing Sheets

IMAGE GENERATION SYSTEM

CROSS-REFERENCE TO RELATED APPLICATIONS

This application is a continuation of PCT application number PCT/NZ2008/000212, filed Aug. 15, 2008, the entire contents of which are incorporated herein by reference, which claims the benefit of New Zealand patent application serial number 560457 filed Aug. 15, 2007 and New Zealand patent application serial number 560457 filed Jul. 14, 2008.

TECHNICAL FIELD

The present invention relates to an image generation system.

In particular, the present invention relates to an image generation system and method using bio-feedback and eye-tracking systems.

BACKGROUND ART

The generation of pictures, text and other images is an important component in human communication. Images provide a permanent or semi-permanent mode of communication capable of relaying a great amount of information in a small timeframe.

Images are also one of the fundamental expressions of human creativity and may be used to convey emotions, thoughts, information and new forms of understanding.

Artists are continually adapting tools and techniques to create new types of images and modes of expression. For example, developments in computer animation technology have transformed film-making and graphic design.

Images may be generated on a piece of physical material (e.g. paper, canvas etc.) or via electronic displays. To generate images a person must manually draw or paint the image using a pencil, pen, brush or other drawing tool, or on an electronic display via a suitably programmed computer, a computer mouse and/or other input device. Other displays may use images captured via a camera or an electromagnetic image capture device or generated by an algorithm specifically designed to create images.

The control of computers via electronic display screens has rapidly developed from keyboards to include mice, pens, touch-screens and other input devices.

During interaction with a graphical user interface (GUI) such devices can be used to control the computer functions in addition to generating images if required.

An intrinsic requirement of such image generation systems is the need for manual input/manipulation by the user to draw an image.

The 'quality' of such an image is thus directly influenced by both the artist's talent and technical ability in manipulating the image.

Users whose hands (or other limbs) are occupied, constrained, restrained, paralyzed or disabled are clearly impeded from maneuvering a pen or interface device without assistance and are thus hampered from controlling a computer, or drawing an image.

To obviate the need for manual interaction with a movable control, various systems have been developed and generally fall into two categories, namely eye-tracking and bio-electrical sensor based systems.

Many known eye-tracking systems are capable of tracking the movement or orientation of a person's eyes to determine the direction of the user's gaze and to control a device accordingly, e.g. known weapon aiming control systems on aircraft may use eye-tracking systems to determine where a pilot is looking and, accordingly aim a slaved weapon.

Further prior art developments on basic eye-tracking systems have used eye-blinks, saccade and other movement to control functions of a computer to provide a control interface for paralyzed patients and the like.

Known bio-electrical control systems include Brain-Computer Interfaces (BCIs) that include electrodes connected to portions of the brain to control devices such as cameras, artificial limbs, control systems or the like. Some BCIs may also receive external signals and convert to electrical impulses passed to the brain to simulate normal sensory systems.

For example, an artificial ear may include a microphone coupled to a processor linked to electrodes in the auditory parts of the brain of a user. The processor is capable of converting the microphone input to appropriate electrical signals to pass to the brain thereby providing the user with hearing ability.

Another form of bio-electrical control system is that used in the computer-based meditation system The Journey to Wild Divine by Smith.

The system devised by Smith uses bio-feedback (i.e. heart-rate and skin conductivity) from sensors placed on a user's fingers to solve problems and complete tasks set by a computer program and displayed on a screen. For example, one such task sets a heart-rate level, below which the user must lower their heart-rate to move onto the next task.

Another biofeedback system is described in U.S. patent application Ser. No. 10/028,902 (published as US 2002/0077534) by DuRousseau. The DuRousseau system uses biofeedback from multiple physiological sources to effect a control interface with a computer. The DuRousseau system however does not track where the user is looking.

An example of a system that combines the eye-tracking functionality and bio-electrical feedback is disclosed in U.S. Pat. No. 5,649,061 by Smyth, the entire contents of which is herein incorporated by reference.

Smyth describes the use of an eye-tracking system combined with an electronic bio-electric signal processor and digital computer to determine the viewer's eye-fixation and determine a mental decision from corresponding event-evoked cerebral electric potential. Thus, a user can control a device by using eye-tracking to set a point of interest or function and a threshold cerebral electric potential to act as a switch or control.

While the Smyth system provides an effective system for controlling machines or the like, Smyth does not describe any way in which the system could be used for generation or control of images.

It would thus be advantageous to provide an image generation system capable of generating or controlling an image by using an interface that does not require physical manual manipulation of a control device.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

According to a first aspect of the present invention there is provided an image generation system for generating an image on a display screen or the like, the image generation system including:

an eye-tracking system capable of determining a user's eye orientation and outputting a signal indicative of same, a bio-feedback sensor capable of detecting activity of one or more physiological functions of the user and outputting a signal indicative of the level of activity, and a processor adapted to receive and process the output signals from the eye-tracking system and bio-feedback sensor, wherein the processor determines an image to be generated on the display screen indicative of the signals from the eye-tracking system and bio-feedback sensor.

Preferably the eye-tracking system is also capable of detecting eye-movement of a user.

Preferably the processor is capable of processing the signals from the eye-tracking system to determine the time-duration in which a user's eyes are directed in one or more viewing directions from the detected eye-orientation, hereinafter termed an "eye-fixation". It should be appreciated that the time-duration may be measured as:

an average time-duration of eye-fixation in a particular viewing direction during a predetermined time-period;

the time-duration of eye-fixation in a particular viewing direction as a proportion of a predetermined time-period; and/or the time-duration of eye-fixation in a particular viewing direction during saccadic eye-movement.

Preferably the processor determines a location to display a part of the generated image from the output signals from the eye-tracking system. For example, in one embodiment, the position of the image (or part thereof) generated on the display screen may correspond to the user's eye-fixation in a particular direction.

Preferably the processor varies at least one parameter of a part of the image to be displayed on the display screen from the output signals from the bio-feedback sensor. For example, in one embodiment, increases in a user's heart-rate may invoke a commensurate increase in a parameter, e.g. brightness, of the image generated on the display screen.

In one embodiment the processor may determine a sound to be generated from a speaker indicative of the signals from the eye-tracking system and/or bio-feedback sensor. Thus, not only is an image generated, but also a sound.

In one embodiment the eye-tracking system and bio-feedback sensor may be adapted to be substantially portable and capable of remotely transmitting a signal to the processor.

According to another aspect of the present invention there is provided a method of image generation using an image generation system substantially as hereinbefore described, said method including;

presenting a first image to a user, determining one or more points of eye-fixation of a user on the first image with said eye-tracking system, said processor determining an image to display on the display screen indicative of the signals from the eye-tracking system and bio-feedback sensor.

Preferably the method substantially as hereinbefore described is implemented by one or more computer systems programmed with computer executable instructions.

Reference herein to a 'parameter' of an image or part thereof includes, but is not limited to, one or more of the: size, color, contrast, brightness, saturation, edge-contrast, hue, pitch, resolution, time-duration of display.

The 'image' displayed on the display screen is preferably a visual representation. It will be appreciated that the image may include any visual representation of abstract or real objects, ideas, features or information and may include text, symbols and the like.

In some embodiments the 'image' may take the form of a 'scientific visualization', i.e. the representation of data as an image.

The 'display screen' as referred to herein includes any form of display capable of producing an image from signals sent by the processor, and by way of example, may include one or more Cathode Ray Tube (CRT), Liquid Crystal Displays (LCD), plasma displays, projectors, virtual retinal displays (VRD) projection displays, Light Emitting Diode (LED) displays or the like.

As used herein, the term 'bio-feedback' refers to a measurable biological metric indicative of the activity of a physiological function of a user.

A physiological function preferably includes the Autonomic Nervous System (ANS).

As used herein, the term 'signals' refers to any form of signal and includes, but is not limited to, one or more electrical, magnetic, or electromagnetic signals.

Many eye-tracking systems are known and use various methods for determining eye-movement and viewing direction and are not explained further herein. Examples of known eye-tracking systems may be found in U.S. Pat. Nos. 5,638, 176, 5,331,149, 5,430,505, 4,720,189, though this list is by no means comprehensive and many eye-tracking systems and sensors are known and capable of being used with the present invention. For example, an exemplary eye-tracking system that may be used with the present invention may be the Tobii™ eye-tracking system produced by Tobii TechnologyAB.

For the purposes of the present invention, the eye-tracking system is preferably capable of detecting the orientation of the eye and thus the viewing direction or 'line-of-sight' of the user. Preferably the eye-tracking system is also capable of detecting eye-movement of a user.

Preferably the eye-tracking system includes an oculometer capable of detecting the orientation of an eye.

Preferably the oculometer is movable on a mounting such that it may be aligned with a user's eyes. For example, the oculometer may be mounted to be rotatable and/or merely moveable about or along vertical and horizontal axes.

In a further embodiment the oculometer may be automatically movable to maintain alignment with a user's eyes.

In yet another possible embodiment, the oculometer may be coupled to a user-location system, the user-location system capable of identifying the location and/or orientation of the user and determining the position of the user's eyes by extrapolating from the user location. Such a 'user-location' system may include any form of object location including: digital cameras and image-recognition software, laser scanner interfaces, optical motion capture systems or the like.

The bio-feedback system preferably includes, but is not limited to, one or more sensors capable of measuring galvanic skin response, heart-rate and blood pressure, cerebral electric potential, skin temperature, muscle tension, heart-rate variability, blood-pressure variability or skin moisture of a user.

It will be appreciated that the 'processor' referred to herein may include multiple individual processors for processing the output signals from each of the eye-tracking system and bio-feedback sensor and for determining an image to display on the display screen.

In one preferred embodiment, a processor is provided for each of the eye-tracking system and the bio-feedback sensor and are programmed to process the output signals from the eye-tracking system and bio-feedback sensor for transfer to a digital computer, the digital computer including a processor capable of determining an image to be generated on the display screen indicative of the signals from the eye-tracking system and bio-feedback sensor.

According to another aspect of the present invention there is provided an image generation system for generating an image on a display screen or the like, the image generation system including:
 a first display having the display screen,
 an eye-tracking system capable of determining a user's eye orientation and outputting a signal indicative of same,
 a processor adapted to receive and process the output signals from the eye-tracking system, and
 a second display for presenting a first image to a user,
 wherein the eye-tracking system is capable of determining one or more points of eye-fixation of a user on the first image, the processor determining a second image to display on the first display indicative of the signals from the eye-tracking system.

In one embodiment the second display may include physical objects or images, such as people, animals, plants, inanimate objects, paintings, drawings, or other artworks, the first image being formed therefrom.

It will be appreciated that where the second display includes such physical objects or images, an image capture device e.g. a video or still camera, may be required to convert the physical first image into signals indicative of same, such that those signals may be processed.

Preferably the processor determines a position of a part of the second image to be displayed on the first display from the output signals from the eye-tracking system. For example, in one embodiment, the position of the parts of the second image generated on the first display may correspond to the user's eye-fixation in a particular direction on the first image.

The part of the first image fixated on may be defined as an area-of-interest e.g. an area of the first image that the user fixates on for a relatively greater time than other areas, or an area which evokes a change in bio-feedback response, indicating a higher level of 'interest' in that area.

In a further embodiment, the processor also determines a parameter of a part of the second image to be displayed on the first display from the output signals from the eye-tracking system. For example, in one embodiment, the scale of the second image generated on the first display may be proportional to the time-duration of a user's eye-fixation on a particular point of the first image.

In another embodiment the processor may determine a parameter of a part of the second image to be displayed on the first display from the output signals from the eye-tracking system indicative of a level of saccade. For example, in one embodiment, the brightness of the second image generated on the first display may increase if the eye-tracking system detects a predetermined level of rapid saccadic eye-movements.

Preferably the image determined to be displayed on the first display is an at least partial copy or representation of the first image.

In a further embodiment, the image determined to be displayed on the first display is an at least partial copy or representation of a part of the first image corresponding to the user's eye-fixation on the first image.

In one embodiment the size of the part of the first image copied and displayed on the first display is dependant on the output signals from the eye-tracking system.

For example, in one embodiment, the extent of saccadic eye-movement of a user may define a particular area-of-interest of the first image which is then copied to the first display. Alternatively, the size of the part of the first image 'copied' may be proportional to the time-duration of eye-fixation on a particular point of the first image.

In one preferred embodiment the second display may include a second display screen, the first image being displayed thereon.

In an alternative embodiment the first and second displays may be parts of a single display screen, e.g. a split-screen display.

In a further embodiment the first image may be a three-dimensional image of a virtual-reality environment, wherein a control system is provided to navigate through the virtual-reality environment and thus change the first image.

In a yet further embodiment, the control system may include the eye-tracking system and bio-feedback sensor. Thus the image generation system may also function as a control system for manipulating a virtual environment.

Preferably the processor is connected to the second display and programmed to present the first image as filtered, processed, distorted and/or rendered at least partially unclear. For example, the first image may be faded, diffuse, dimmed, or otherwise unclear.

In a further embodiment the processor is programmed to vary at least one image parameter the first image to improve image clarity (e.g. by increasing brightness) when the eye-tracking system detects the user looking at a said part of the first image. Thus, by looking at various parts of an 'unclear' first image the user may make clear those parts.

According to yet another aspect of the present invention there is provided an image generation system for generating an image on a display screen or the like, the image generation system including:
 an eye-tracking system capable of determining a user's eye orientation and outputting a signal indicative of same,
 at least one bio-feedback sensor capable of detecting activity of one or more physiological functions of the user and outputting a signal indicative of the level of activity,
 a processor adapted to receive and process the output signals from the eye-tracking system and bio-feedback sensor, and
 a second display for presenting a first image to a user,
 wherein the eye-tracking system is capable of determining one or more points of eye-fixation of a user on the first image, the processor determining a second image to display on the first display indicative of the signals from the eye-tracking system and bio-feedback sensor.

Preferably the processor determines a position of a part of the second image to be displayed on the first display from the output signals from the eye-tracking system. For example, in one embodiment, the position of the second image generated on the first display may correspond to the user's eye-fixation in a particular direction on the first image.

Preferably the processor determines a parameter of a part of the second image to be displayed on the first display from the output signals from the bio-feedback sensors. For example, in one embodiment, the scale of the image generated on the first display may be proportional to the user's blood-pressure.

In another embodiment the processor may determine a parameter of a part of the image to be displayed on the first display from the output signals from the eye-tracking system indicative of a level of saccade. For example, in one embodiment, the brightness of the image generated on the first display may increase if the eye-tracking system detects a predetermined level of rapid saccadic eye-movements.

Preferably the image determined to be displayed on the first display is an at least partial copy or representation of the first image.

In a further embodiment, the image determined to be displayed on the first display is an at least partial copy or representation of a part of the first image corresponding to the user's eye-fixation on the first image.

It will be appreciated that the processor may be adjusted to link any particular parameter of the second image displayed with any particular bio-feedback parameter. For example, in one embodiment, where a part of the first image invokes strong 'interest' (i.e. an area-of-interest) from the user (as detected by the bio-feedback sensors), the copy of the first image part may be displayed slightly smaller and with full color. In another embodiment, where the user merely glances at a first image part, the copy' may be slightly larger, more diffuse, and, lacking in color i.e. gray scale.

It will be appreciated that numerous copying configurations are possible and the image parts displayed on the first display may be any shape and size and need not correspond to the first image part copied.

Preferably the size of the part of the first image 'copied' and then displayed on the first display is dependant on the output signals from the bio-feedback sensor. For example, in one embodiment a user may view a first image and parts of that first image are 'copied' to the first display, the size of the part copied proportional to the galvanic skin response of a user.

In an alternative embodiment, the size of the part of the first image copied and displayed on the first display is dependant on the output signals from the eye-tracking system. For example, in one embodiment the extent of saccadic eye-movement of a user may define a particular 'area-of-interest' of the first image which is then copied to the first display to form the second image.

In preferred embodiments the second display may be a second display screen, the first image being displayed thereon.

In a further embodiment the first image may be a three-dimensional image of a virtual-reality environment, a control system provided to navigate through the virtual-reality environment and thus change the first image.

In another embodiment, the second display may include physical objects or images, such as people, animals, plants, inanimate objects, paintings, drawings, or other artworks, the first image being formed therefrom.

It will be appreciated that where the second display includes such physical objects or images, an image capture device e.g. a video or still camera, may be required to convert the physical first image into signals indicative of same, such "that those signals may be processed.

The present invention may thus provide an improved image generation system, capable of generating an image on a screen based on eye-movement and bio-feedback of a user.

According to yet another aspect of the present invention there is provided a communication system for allowing communication between users at two separate user locations, the communication system including two image generation systems, each said image generation system operable to generate an image on a viewer display screen and each image generation system including:

an eye-tracking system capable of determining a user's eye orientation and outputting a signal indicative of same,     bio-feedback sensor capable of detecting activity of one or more physiological functions of the user and outputting a signal indicative of the level of said activity,     a processor adapted to receive and process the output signals from the eye-tracking system and bio-feedback sensor, and     a second display for presenting a first image to the user, the second display connected to an image capture device to capture said first image, wherever the eye-tracking system is capable of determining one or more points of eye-fixation of a user on the first image, the processor determining an image to display on the display screen indicative of the signals from the eye-tracking system and bio-feedback sensor, and at each of said user locations, the bio-feedback sensor, eye-tracking system, processor and second display screen of one image generation system, and the viewer display screen and image capture device of the other said image generation system are located, and     each image capture device is configured to capture an image and display said captured image on the second display at the other location,     each processor is configured to determine an image to display on the viewer display screen at the other location indicative of the signals from the eye-tracking system and bio-feedback sensor.

The image capture device is preferably a video camera adapted to capture an image of one of the users at the respective location. It will be appreciated that an audio capture device may also be used to transfer audio between the users at the separate locations.

Reference herein to a "video camera" should be understood to include all devices capable of capturing a still or video image and includes digital and analog devices.

Thus, each user may communicate by viewing a video-feed of the other user while also simultaneously viewing an image generated on another screen of an image generated by the signals from the eye-tracking system and bio-feedback sensor of the other user.

According to another aspect of the present invention there is provided a sound generation system for generating a sound from a speaker or the like, the sound generation system including:

an eye-tracking system capable of determining a user's eye orientation and outputting a signal indicative of same,     at least one bio-feedback sensor capable of detecting activity of one or more physiological functions of the user and outputting a signal indicative of the level of activity, and a processor adapted to receive and process the output signals from the eye-tracking system and bio-feedback sensor, wherein the processor determines a sound to be generated from the speaker indicative of the signals from the eye-tracking system and bio-feedback sensor.

In a further embodiment the processor also determines an image to be generated on a display screen indicative of the signals from the eye-tracking system and bio-feedback sensor.

The present invention may thus provide an improved sound generation system, capable of generating a sound from a speaker based on eye-movement and bio-feedback of a user.

According to yet another aspect of the present invention there is provided a method of image generation including:
    presenting a first image to a user;
    determining the user's eye-orientation using an eye-tracking system;
    measuring the activity of one or more physiological functions of the user using a bio-feedback system;
    generating a second image indicative of the user's eye orientation and physiological function(s).

It should be appreciated that the first image may be actively presented to the user e.g. via a display screen, or alternatively may form part of any physical or virtual environment capable of being viewed by a user.

According to a further aspect of the present invention, there is provided a method of assessing a user's response to a presented image, the method including:
    presenting a first image to a user;
    determining the user's eye-orientation using an eye-tracking system;
    measuring the activity of one or more physiological functions of the user using a bio-feedback sensor;
    generating a second image indicative of the user's eye orientation and physiological function(s);
    correlating parts of the image identified as areas-of-interest with the bio-feedback measured when the user fixates on the areas-of-interest.

Thus, this method may be used to measure a physiological manifestation of a user's emotional response to an image presented to the user.

According to a further aspect of the present invention, there is provided a method of image generation including:
    a) presenting a first image of a virtual environment to a user;
    b) determining the user's eye-orientation using an eye-tracking system;
    c) measuring the activity of one or more physiological functions of the user using a bio-feedback sensor;
    d) changing said first image presented to the user to present a new 'second' image, the second image being indicative of the user's eye orientation and physiological function(s) when viewing the first image.

Preferably, steps a)-d) of the aforementioned method are performed iteratively. Thus, the user may be provided with the ability to interact with the virtual environment, e.g. as in a computer game or educational software. The image presented to the user may thereby be based on where they look in the virtual environment and their physiological response to where they look.

Preferably, the image presented to the user is indicative of the virtual environment surrounding and/or proximal a virtual entity, e.g. an avatar's view.

As used herein the term 'avatar' refers to a virtual representation of a person, or a game character or other virtual entity capable of being controlled by the user in a virtual environment, e.g. a computer game environment.

The sources for images generated and processed by the image generation system may range from static images such as computer interfaces, photographs, graphic designs, advertisements, physical environments or images of dashboards, to real-time viewing of video inputs from any source whether computer generated or video captured.

According to another aspect of the present invention, a said display may be a three-dimensional display device such as a '3D' printer, robot, digital fabricator or the like. Thus, the 'image' generated may be a physical three-dimensional object indicative of the signals received from the bio-feedback sensor and eye-tracking system.

According to yet another aspect of the present invention, the second display may be a virtual three-dimensional element, the processor configured to alter the three-dimensional characteristics of said element to a form indicative of the signals received from the bio-feedback sensor and eye-tracking system.

In one embodiment, the three-dimensional element is an 'avatar' or the like in a virtual environment.

Thus, the image generated may not necessarily be immediately visible as the image generated is an alteration of a 3D element and may only be visible when viewing the element at a particular virtual 'angle', 'perspective' 'lighting' or the like.

In another embodiment, the three-dimensional element is an aspect of 'lighting' within the virtual environment.

According to yet another aspect of the present invention the image generation system further includes at least one motion sensor capable of determining movement of the user and outputting a signal indicative of same, processor capable of determining an image to be generated on a said display indicative of the signals from the eye-tracking system, bio-feedback sensor and motion sensor.

It should be appreciated that in another aspect, any one of the methods as aforementioned may be implemented by computer program instructions stored on a computer-readable medium, e.g. computer memory, disc, RAM or ROM.

The present invention may thus be used as a control in a virtual reality environment for manipulating virtual objects and/or entities within the virtual environment through use of a combination of eye-tracking, bio-feedback and motion sensing.

The present invention may thus provide an image generation system capable of generating an image indicative of a user's eye-fixation and physiological response when viewing an image.

BRIEF DESCRIPTION OF DRAWINGS

Further aspects and advantages of the present invention will become apparent from the following description which is given by way of example only and with reference to the accompanying drawings in which.

BEST MODES FOR CARRYING OUT THE INVENTION

Figure 1:
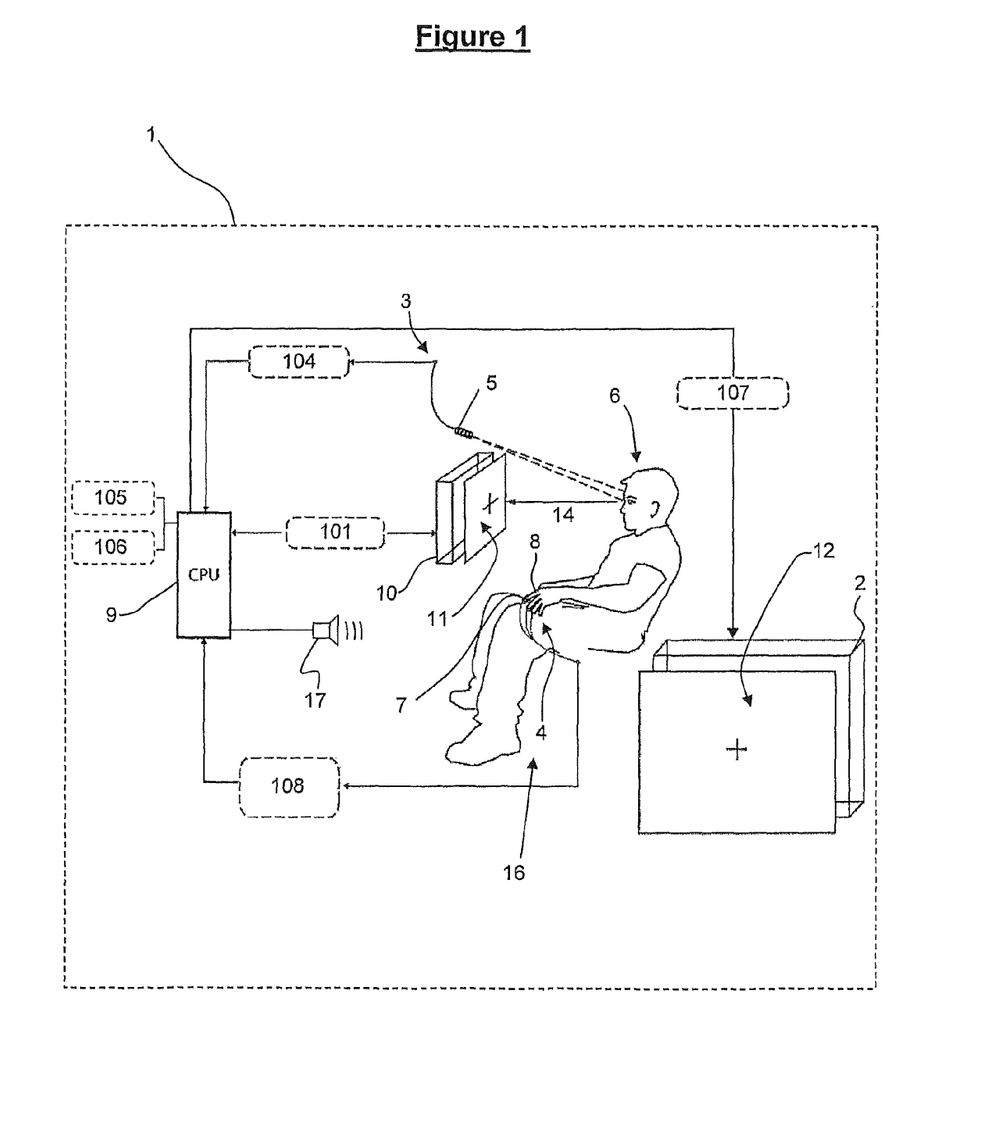
FIG. 1 shows a schematic diagram of an image generation system according to a first preferred embodiment of the present invention.

FIG. 1 shows an image generation system (1) according to one preferred embodiment of the present invention. The image generation system (1) has a 'first' display screen (2) for displaying an image (12) indicative of the signals from an eye-tracking system (3) and bio-feedback sensors (4).

The eye-tracking system (3) has an oculometer (5) capable of determining the eye-orientation of a user (6) and outputting a signal indicative of same. The oculometer (5) thus allows the viewing direction or 'eye-fixation' (14) of the user (6) to be determined.

The bio-feedback sensors (4) are provided as sensory pads (7) attached to the fingers (8) of the user (6) and form part of a bio-feedback system (16). The sensory pads (7) are capable of outputting a signal dependant on the heart-rate, galvanic skin response or other physiological function of the user (6).

The image generation system (1) has a digital signal processor (9) programmed to receive and process the output signals from the eye-tracking system (3) and bio-feedback sensors (4). The processor (9) forms part of a computer system such as a personal computer (PC) (not shown). The image generation system (1) is integrated with the computer system and provides an interface for the user (6). The computer program for controlling the processor (9) is stored on a computer-readable medium such as a computer Hard Disk Drive, CD/DVD-ROM, Solid-state memory device or similar.

A second display is provided in the form of second display screen (10) for presenting a first image (11) to the user (6).

The image generation system (1) also incorporates a speaker (17) that is configured to generate a sound, thus adding an additional stimulus for the user (6). The processor (9) can be configured to monitor the sound from the speaker (17) for correlation with the bio-feedback (108) and eye-tracking (104) responses. Monitoring the user's responses to both sound and images can provide additional information about the user (6) and the correlation between different sounds and images. Alternatively, the processor (9) can be configured to output a sound indicative of the signals from the eye-tracking (3) and/or bio-feedback (16) systems.

The eye-tracking system (3) is capable of determining one or more points of eye-fixation of the user (6) on the first image (11), the processor (9) then determining the second image (12) to display on the display screen (2) indicative of the signals from the eye-tracking system (3) and bio-feedback sensors (4).

The image (12) displayed on the display screen (2) is a composite image formed by 'copying' parts (13) of the first image (11) corresponding to the user's eye-fixation i.e. the parts (13) of the first image (11) which the user (6) looks at during saccadic eye-movement, or stares at for a predetermined period of time. These parts can be considered 'areas-of-interest' i.e. areas in which the viewer is most interested.

The parameters, e.g. size, intensity, contrast, clarity, coherence and color of the part (13), of the first image (11) copied and displayed on the first display screen (2) as second image (12) are indicative of the output signals from the bio-feedback sensors (4), e.g. the size of the part (13) may be proportional to the heart-rate of the user (6), while the intensity and color is dependant on the galvanic skin response.

The processor (9) determines a coordinate location of a part (13) of the first image (11) to be copied and displayed on the first display screen (2) from the output signals from the eye-tracking system (3), i.e. the location of the second image (12) generated on the first display screen (2) corresponds to the user's eye-fixation in a particular direction on the first image (11).

Each user has a different relative eye-position and size and thus the system (1) will require calibration for each new user.

The calibration procedure, according to one preferred embodiment, is as follows:
a) the user (6) wears a headpiece (not shown) having reference transmitters (not shown) attached to either side of their head which communicate with receivers (not shown) to locate the head position of the user (6);
b) the oculometer (5) is aligned with the user's eyes to detect the pupils;
c) the relative spatial separation of the user's eyes and reference transmitters are then stored in a memory store (not shown);
d) the processor (9) is programmed to move the oculometer to maintain alignment with the eyes.

The system (1) is thus calibrated such that the receivers will indicate movement of the user's head and the oculometer (5) will realign accordingly based on the stored value of the spatial separation.

The viewing direction or eye-fixation (14) can then be calculated using suitable algorithms from the position of the user's head and orientation of the eyes.

It will be appreciated by one skilled in the art that the computer program of the present invention may be constructed to suit the application. However, in general, the present invention will use a computer program that incorporates bio-feedback and eye-tracking signal processing algorithms and one or more image generation algorithms.

The bio-feedback algorithm compares the digital signals from the bio-feedback (4) sensors with an index of physiological indicator values and then calculates temporal bio-feedback data indicative of the user's physiological state.

Similarly, the eye-tracking algorithm processes the signals received from the oculometer. The eye-tracking algorithm compares the digital signals with a spatial index representing location references of pixels displayed on the first (11) and/or second (12) images. The eye-tracking algorithm then produces temporal eye-tracking data matching the location of the pixels or general area of the image (11 or 12) that is being viewed by the user (6).

The processor (9) processes the bio-feedback and eye-tracking data with an image generation algorithm that uses pre-defined rules (or an adaptive rule system) to output image data that is used by a Graphics Processing Unit (GPU) to alter the original image (11) or generate another image (12). The image generated (11 or 12) is thus a temporal representative of the direction the user (6) is looking and the bio-feedback response of the user at that time.

The computer program is constructed as a module of a Source Development Kit (SDK) that provides software developers with an interface with the bio-feedback and eye-tracking systems and on which the developer can build a program utilizing the bio-feedback and eye-tracking data output.

It should be appreciated that a communications system is also capable of being formed by communicatively coupling two said image generation system (1) together, each system (1) including first (2) and second (10) display screens with the first display screen (2) of each system (1) acting as the second display screen (10) for the other system. Video cameras capture an image of each user for display to the other user on additional screens, or a split screen display. The image (11) presented to each user is thus formed by what the other user sees and their physiological response to what they see.

Figure 2:
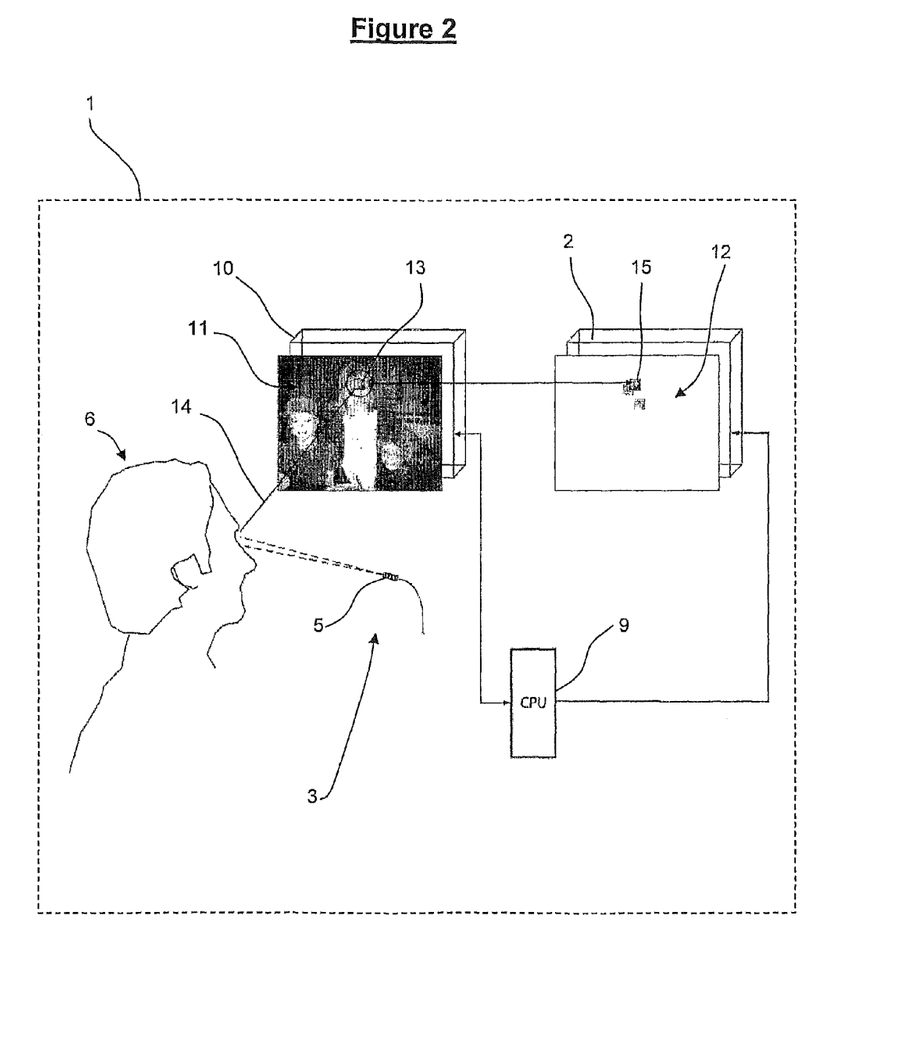
FIG. 2 shows a schematic diagram of an' image generation system according to a second preferred embodiment of the present invention.

With reference to FIG. 2, a further preferred method of operating the image generation system (1) is now described.

After a user (6) enters a darkened room environment containing the image generation system (1), having a second display screen (10), the system (1) is calibrated using the above calibration procedure.

After the system (1) is calibrated, first image (11) is displayed on the second display screen (10). Using control buttons (not shown), the user can control the images (11) displayed and cycle through a sequence of images (11). The images (11) may be a static set of pre-selected images or a video feed. The image generation system (1) can also be used to select pre-processed images where the range of images is restricted to images from an 'array' or a 'stack'. In this case, "portions" of images might be referenced in real-time using eye-tracking (104) while bio-feedback (108) is used to determine which image from the restricted array or stack the "portion" is drawn from.

The images (11) are initially displayed as dimmed or otherwise difficult to see, but as the user (6) tries to look at the images (11), they notice 'areas-of-interest', i.e. the areas of the image (11) where the eyes naturally look at, or are 'drawn' to.

The oculometer (5) detects the viewing direction (14) and passes this information to the processor (9) which determines points of 'eye-fixation' by measuring the time-duration in which the user's eyes are looking at a part (13) of the first image (11). Algorithms are applied to determine whether that time-duration is sufficient for that part (13) of the image (11) to be considered an 'area-of-interest'.

When an 'area-of-interest' is detected, the processor (9) passes signals to the second display screen (10) to increase the brightness and contrast of the image part (13) to thus increase clarity.

The size of the part (13) of the first image (11) identified as an 'area-of-interest' is dependant on the output signals from the oculometer (5) i.e. the extent of saccadic eye-movement of the user (6) defines the size of the image part (13) considered an 'area-of-interest'.

Thus, by simply looking at the image (11), the user (6) can clarify the parts (13) of the image (11) as it interests them. With the control buttons (not shown) the user (6) can move through the pre-selected set of images or control a video feed.

Simultaneous with this identification of 'areas-of-interest' is the copying and display of the part (13) of the image (11) as an image part (15) of second image (12) on the first display screen (2). The first display screen (2) is remote to the second display screen (10) and is not visible to the user (6). The first display screen (2) is however visible to an audience or another participant (not shown). The remote display screen (10) provides a 'default' background image or darkened display onto which the 'areas-of-interest' (13, 15) are displayed.

The parameters, e.g. size, intensity, contrast, clarity, coherence and color of the part (13), of the first image (11) copied and displayed as image parts (15) are dependant on the output signals from the bio-feedback sensors (4) (shown in FIG. 1 only).

Thus, the intensity and color of image part (15) is dependant on a level of 'excitation' of the user (6) as determined by the processor (9) from the signals from the bio-feedback sensors (4) detecting the galvanic skin response or heart-rate of the user (6).

The parts (15) of the remotely displayed image (12) are typically faded towards the edge of the part (15) to provide an enhanced visual effect.

The size of the image part (15) displayed corresponds partially to the size of the 'area-of-interest' or part (13) (i.e. proportional to the extent of saccadic eye-movement of the user (6)) and due to the level of 'excitation' of the user (6) as determined by the processor (9) from the signals from the bio-feedback sensors (4).

The only image seen on the remote first display screen (2) is a second image (12) constructed by the copying of 'areas-of-interest' (parts (13)) selected by the user (6). The areas of the image (11) that are not identified as 'areas-of-interest' are not displayed on the remote screen (2). The parts (15) of the remote image (12) are displayed for a set time-period proportional to the level of relaxation or excitation of the user (6) as detected by the bio-feedback sensors (4) when looking at the corresponding first image part (13). The areas-of-interest (15) may also be retained as a visual record of visual and physiological activity on the part of the user.

The image parts (15) appear and fade-away as the user (6) changes the point of eye-fixation on the first image (11) thus creating a 'real-time' record on the audience display screen (2) of where the user (6) is looking at, and the user's visual 'areas-of-interest on the first image (11).

When a user (6) looks at a part (13) of an image repeatedly, the corresponding part (15) of image (12) will be reinforced.

The image (12) on the audience display screen (2) is thus a composite image formed by parts (13) of image (11) copied onto the display (2) in saccadic movements corresponding to the movements of the user's eyes. Merged or overlapped copied parts (15) which have the potential to reach a point of visual 'saturation' are controlled by averaging or interpolating pixel values so as not to exceed pre-established thresholds and render the image (12) indiscernible.

Figure 3:
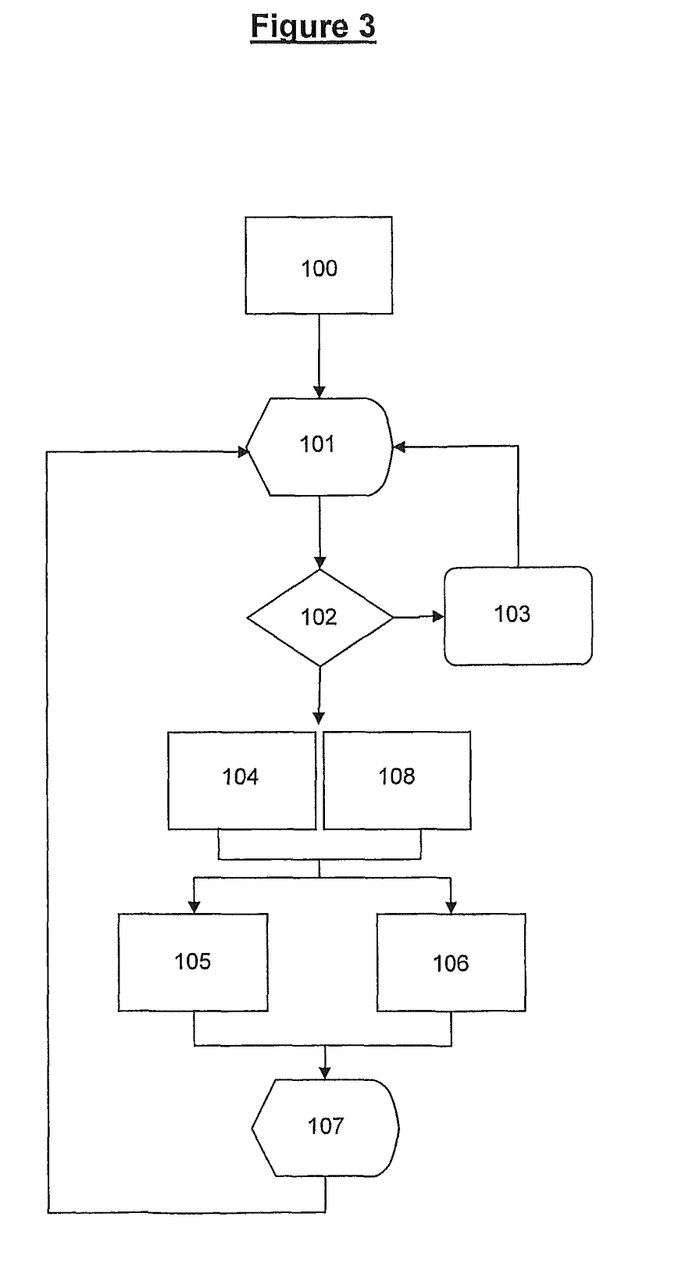
FIG. 3 shows a process diagram of a method of operating the image generation system shown in FIG. 1 or 2.

FIG. 3 shows a process diagram of a method of operating the image generation system (1) as shown in FIG. 1 or FIG. 2. These processes are also shown in FIG. 1.

After calibration (100), a first image (11) is presented (101) to a user on a second display screen (10). The user (6) decides (102) whether the first image (11) is to remain or be changed (103) by choosing another image by cycling through pre-selected images either randomly or in a predetermined sequence.

The processor (9) determines (104) an orientation of the user's eyes from the signals from the eye-tracking system (3) and therefore also a point of eye-fixation (14) on the first image (11).

The processor (9) determines the size, (process 105) of the part (13) of the image (11) to be copied and the parameters, (process 106) of the copied image part (15) to be displayed on the display screen (2) indicative of the input (108) received from the bio-feedback sensors (4).

The processor (9) then sends (107) signals to the display screen (2) to display the copied image part (15).

The steps 101-107 are repeated iteratively. The image (12) displayed (107) will also change as the user (6) looks at different portions of the first image (11) and/or changes (103) the first image (11).

Figure 4:
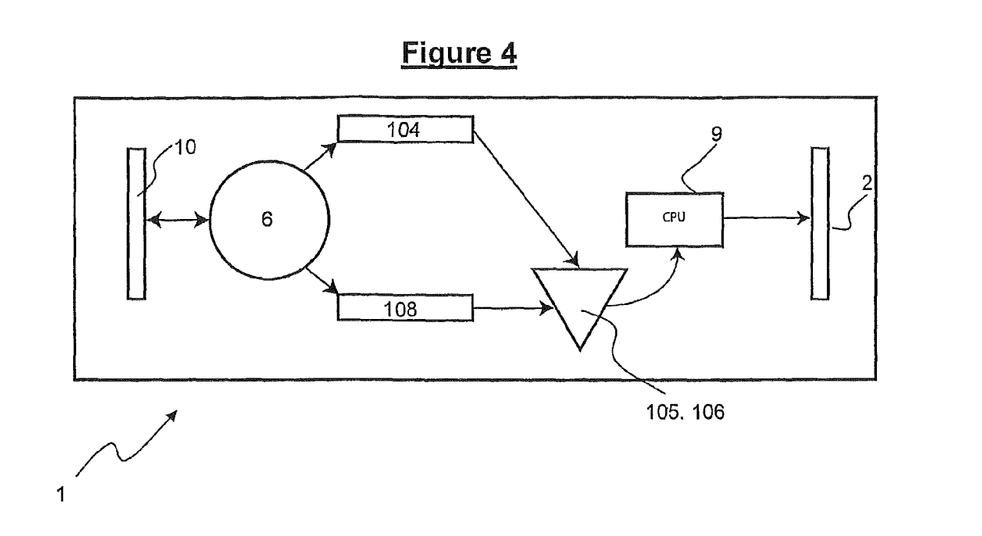
FIG. 4 shows a system diagram of the image generation system shown in FIGS. 1 and 2.
Figure 5:
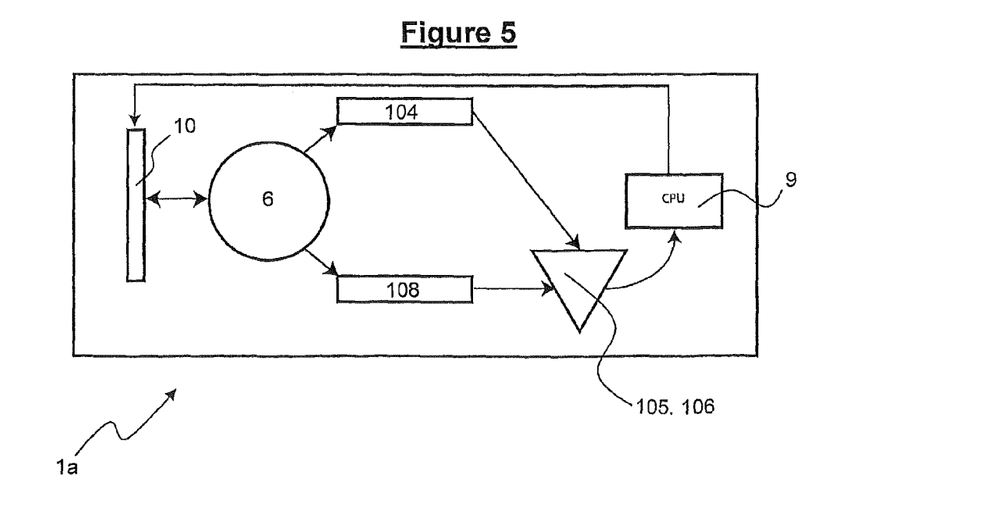
FIG. 5 shows a system diagram of an image generation system according to a second preferred embodiment of the present invention, the image generation system having a single display.

System diagrams of two preferred embodiments of the image generation system (1) are shown in FIGS. 3 and 4. FIG. 3 shows a system diagram of the image generation system (1)

of FIGS. 1-3 while FIG. 4 shows an alternative embodiment (1a) where the first (11) and second (12) images are displayed on the same display screen (10). The system (1a) shown in FIG. 5 is also used in applications where the second image (12) is formed by modifying the first image (11) in response to the bio-feedback (108) and/or eye-tracking (104) inputs.

It will be readily apparent to one skilled in the art that the image generation system (1) has particular application in computer gaming, e.g. the combination of bio-feedback (108) and eye tracking (104) measurements can be used as controls for manipulating the visual game environment.

Reference herein to "computer games" should be understood to refer to all interactive computerized systems utilizing a display screen and by way of example may include: computer or gaming console software, gambling or 'slot' machines, vending machines or the like.

Computer games often present game participants with scenarios and characters or 'avatars' within an interactive virtual environment. These virtual environments present a visual space within which the user (6) interacts with other users and/or computer generated elements.

The image generation system (1) can use the eye-tracking system (3) and bio-feedback sensors (4) systems to determine and monitor where the user (6) is looking within the virtual environment and measure the bio-feedback (108) to attribute a measurement of a physiological function to the parts of the virtual environment that are looked at. Thus, the user (6) can interact with the environment and/or the environment can be programmed to change in response to the bio-feedback (108) and eye-tracking (104) response.

The applications for the image generation system (1) in computer games are many and varied. For example, the image generation system (1) may be used in any application from use as a relatively simple design or control tool for visual changes, to a more complex interactive control where the generation and navigation of a virtual environment is controlled by the learned coordination of simultaneous eye movement and body state.

A theoretical example of using the image generation system (1) as such a complex control may be in an interactive "slip stream" event such as in the television series "Andromeda" where the user (6) controls the environment by coordination of eye-movement and body-state.

Another exemplary computer game using such a control may involve travel of a user's (6) 'avatar' through a virtual 'tunnel'. The user/avatar is guided by image modulations that visually reflect the bio-feedback measurements (108). The user (6) maintains a directed movement "through" the visual space by consciously controlling or responding to images (12) generated representing the bio-feedback (108) while simultaneously directing the user's (6) eye-fixation (14) toward a visual objective that provides a reward or achieves a goal, e.g. continuing the movement or selecting an exit. The computer game may be configured such that if there is an involuntary or unconscious change, e.g. where the user (6) enters a changed body state or the user's eyes are distracted, the user (6) may find their avatar deposited in a different and possibly unexpected environment with a new ratio of positive and negative sets of attributes for engagement.

Figure 6:
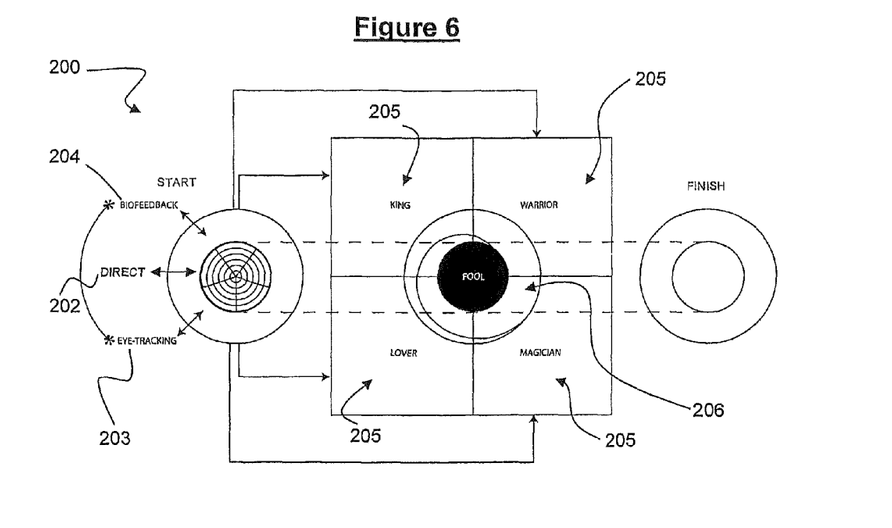
FIG. 6 shows a process diagram of a computer game for use with the image generation system of FIG. 5.

An example of a computer game using the image generation system (1) is shown in FIG. 6 and is generally indicated by arrow 200. The computer game (200) is configured to control the processor (9) to present visual and/or auditory information to the user (not shown in FIG. 6) and the user responds using inputs (201) including direct input (202), changes in eye-orientation (203) and/or bio-feedback (204). The processor (9) receives the inputs (201) and accordingly modifies the information presented to the user (6) according to one or more of the game algorithms. While not shown in FIG. 6, the information is presented via a display screen (10) and speakers (17) as shown in FIG. 1.

The computer game (200) can thus be controlled by the user to change an avatar's attributes (e.g. emotions, skills etc.) to correspond with a possible selection of avatar entities (205), including "Lover", "Magician", "Warrior" and "King". The user can only transition to a final entity (206) ("Fool") after reaching one or more of the earlier entitles (205) or by having such control over their bio-feedback (204) and/or eye-orientation (203) that they can transition directly from the start. Once in the "fool" entity (206) the user can transition to another level of engagement or finish and complete the game. The computer game (200) is also configured to introduce or posit visual elements or objects, (e.g. weapons, magic items, characters etc.) into the environment in response to preset algorithms or to changes in eye-orientation (203) or bio-feedback (204).

In another computer game the image generation system (1) may be used as a virtual movement or manipulation tool where the user (6) moves through a virtual environment looking for "enemies", e.g. as in a combat simulation. The computer game is configured such that when the user (6) "looks" around and moves through the environment they produce different unconscious responses (bio-feedback (108)) to elements in the environment. As they have these experiences, the response (108) triggers visual changes within the environment or may open a 'portal' or 'window' to a parallel environment with a different set of decision trees that are discontinuous with the "logic" of the previous or current environment.

Figure 7:
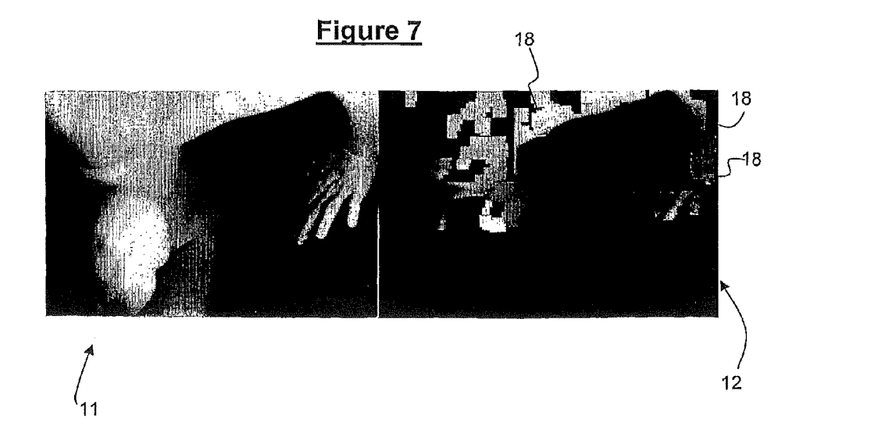
FIG. 7 shows two screenshots of another computer game for use with the image generation system of FIG. 5.

An example of the generation of a portal or window of such a computer game is shown in FIG. 7. The portal or window is generated by using the image generation system (1) to create a transitional phase where parts of a second image (12) are superimposed on the image presented to the user, e.g. the first image (11), depending on the area of the first image (11) corresponding to the location of the user's eye-fixation (14). The second image (12) represents another virtual environment, entity or element.

The second image (12) will grow in size, clarity or brightness if the eye-fixation is maintained and, depending upon whether the user (6) reaches a particular parameter set of combined eye-tracking (104) and bio-feedback (108) responses, the visual transition will either fade back into the first image (11) or continue to grow to displace the first image (11). Thus, the second image (12) may provide a visual "portal" effect, e.g. as shown in FIG. 7, by generating such visual "swatches" (18) of the second environment that appear in the form of a "rain" or "sizzle" of swatches (18) which increase in number and/or size to resolve into the second computer generated environment.

It should also be appreciated that the bio-feedback (108) and/or eye-tracking (104) responses may be used to alter the visual representation of the avatar to other players of the game, e.g. other players may see a different visual representation of the avatar than the user controlling the avatar. The physiological state of each player may thus be represented as a visual alteration of the players' avatars thereby providing another dimension to interactive computer gaming. In one embodiment the visual alteration may be a change in the facial expression of the avatar.

The visual representation of an avatar can thus provide a source of visual information within a display, e.g. acting as a display within a display. Such an embodiment can be useful in alternate reality worlds for representing the emotions of users which, in the real world would be provided as facial expressions. The representation of emotional states may also be useful in digital communications (e.g. email) by attaching an indicator representing the emotional state of the sender, thus providing a greater level of information to the receiver.

The following examples are various other applications for which the present invention has particular use. However, it will be appreciated by one skilled in that art that the principles of the present invention has application in many technological fields and the examples herein should not be seen to be limiting.

The present invention is useful in the assessment of the efficacy of information presentation in, for example, advertising, education, and promotions. This assessment is achieved by using the image generation system (1) to assess correlations between the combined response from the eye-tracking (3) and bio-feedback (16) systems with the effectiveness of information delivery in terms of information retention, recall, and comprehension. In such an application the image generation system (1) will be generally the same to that shown in FIGS. 1 and 2. The processor (9) however may be programmed to process the bio-feedback (108) and eye-tracking (104) responses to provide data and/or visual information to the display screen (2) rather than generate a composite image (12). The data and/or information provides an educator with measures of the user's (6) response to visual and/or and auditory information presented to the user (6).

Education utilizing computers and associated software can be engaging to a degree, though the uniform delivery of the materials lacks the emotional interactions that a teacher can use to keep a student motivated and on-task. Repeated prompting and encouragement generated by the computer software may leave the student disinterested and the prompts may prove 'empty' and 'programmed'.

Thus, Instructional designers, especially those developing distance education interactions, can utilize the image generation system (1) to monitor the effectiveness of educational design materials, i.e. by monitoring the eye-tracking (104) and bio-feedback (108) responses to educational stimuli. A generalized measure of the educational experience can be derived for use in instructional re-designs by correlating the responses of multiple users to the same tasks and materials. The image generation system (1) can also show such responses to the user in 'real time', thereby providing a dynamic investigation tool. The bio-feedback (108) and eye-tracking (104) responses may be used, for example, to indicate areas needing further attention.

Figure 8:
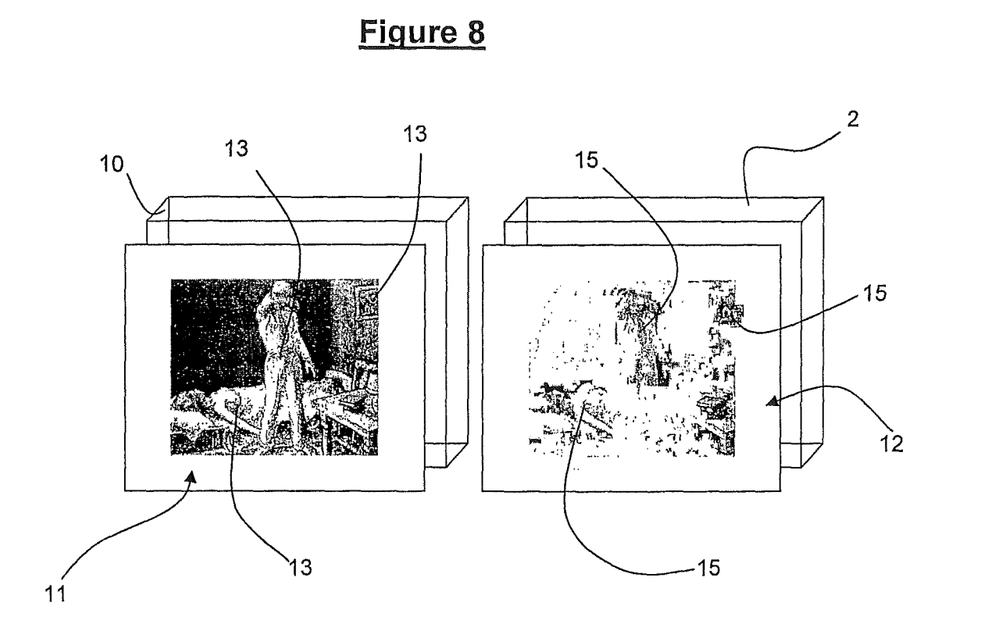
FIG. 8 shows the first and second display screens of the image generation system of FIGS. 1-4.

Another application for the image generation system (1) is in providing visual indications of the effectiveness of visual designs, e.g. advertising and promotional images or video and an example is shown in FIG. 8. The image generation system (1) includes the first (2) and second (10) display screens, as also shown in FIG. 1. The second display screen (10) presents an image (11) to the user (6). The processor (9) measures the signals from the bio-feedback (16) and eye-tracking (3) systems to determine the 'areas-of-interest' (13) and the associated physiological response. The parts (13) of the image (11) identified as 'areas-of-interest' are superimposed on the first display screen (2) as parts (15) and indicate those portions that attract the user's (6) attention and those that evoke a physiological response. The parts (13) that evoke a physiological response are indicated by brighter and/or less diffuse parts (15) of the image (12). The image generation system (1) can thus be used to establish correlations between the visual and affective associations of visual design with identification recognition and targeted product associations. The image generation system (1) can also be used in studying the visual effectiveness of any kind of visual display to deliver information that is retained by the user, whether the information is educational or promotional.

The image generation system (1) may also find use in psychological projection testing, i.e. tests like the Thematic Apperception Test (TAT) that are administered, scored, and interpreted by a therapist or other tester who requests a subject talk about what is shown in a set of images.

In a TAT the responses to the testing are recorded (written, audio or video) and assessed based upon the experiences and training of the tester and supporting instructional documentation for the test.

The image generation system (1) shown in FIGS. 1 and 2 can be used to support such testing by monitoring the eye-fixation (14) of the user (6) to identify the 'areas-of-interest' in the image (11) presented. Thus, by correlating the areas-of-interest with the corresponding "emotional" (physiological) responses measured by the bio-feedback sensors (7), the tester can determine the emotional response to particular images or parts thereof and therefore create a possibly more 'complete' account of the user's (6) responses. The image generation system (1) can thereby potentially provide a more objective recording of the testing, rather than relying on the user's (6) verbal responses to the images (11) or to a particular tester's interpretation of such responses.

Such an image generation system (1) can also be used to train military, law enforcement, emergency service personnel or persons who are exposed to graphically violent or disturbing environments. The image generation system (1) can be used to measure a user's responses to images presented and thereby facilitate training of the user to control their physiological response when presented with adverse environments.

Yet another application for the image generation system (1) is in user-interaction analysis and usability testing. The information garnered from usability and interaction analysis using the image generation system (1) is potentially more useful for many types of analysis as the bio-feedback (108) and eye-tracking (104) responses are coupled together to generate a visual image (12) of the user's (6) response and interaction with the testing environment. The combination of eye-tracking (104) and bio-feedback (108) to generate corresponding images (12) can be correlated with assessments of the effectiveness of visual communications in delivering information, or, as in the case of a computer interface or web-page, the usability and navigability.

Figure 9:
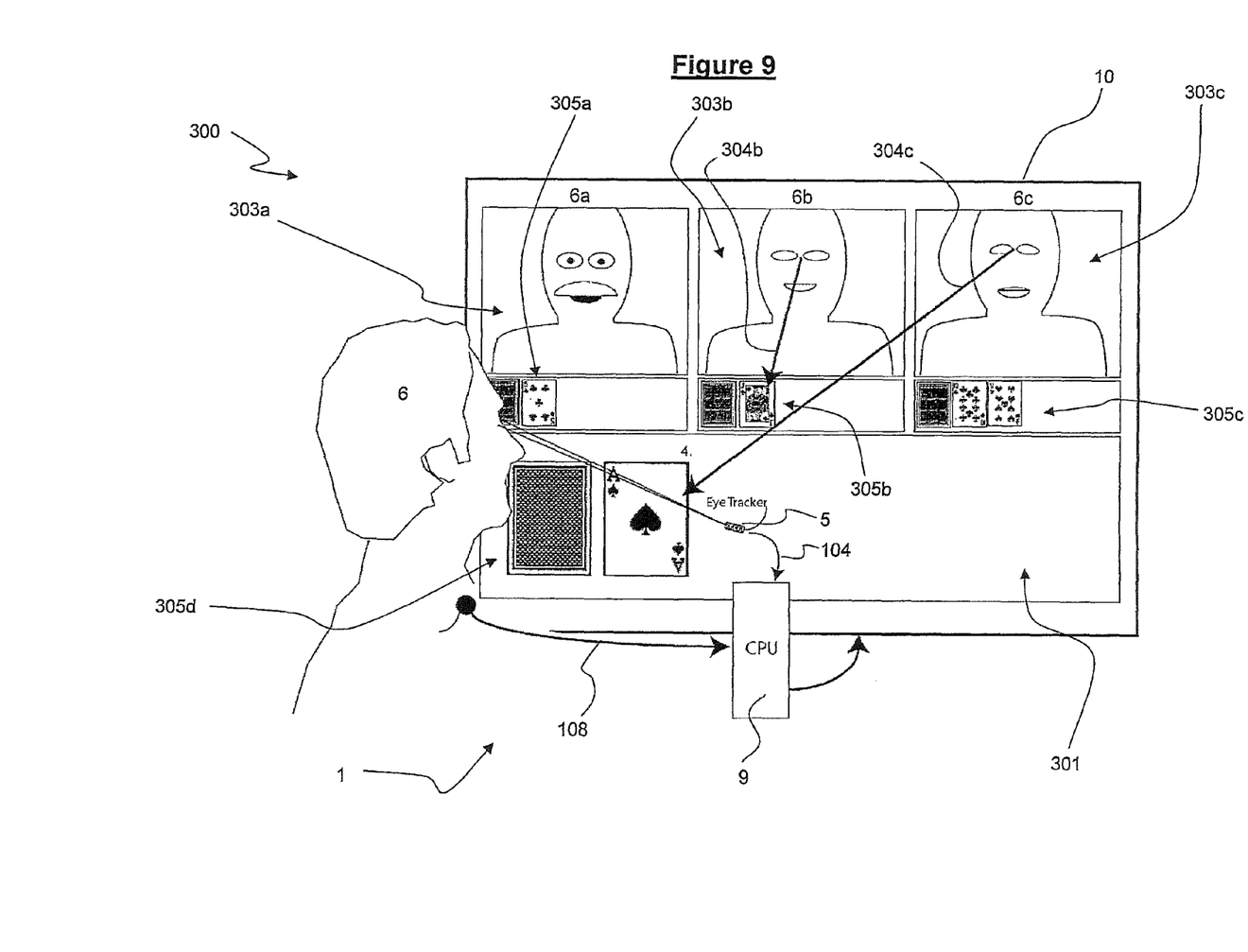
FIG. 9 shows another embodiment of the present invention, implemented as a computer game.

FIG. 9 shows yet another embodiment of a computer 'game' using the present invention. This game (300) is a blackjack game run from a server on a computer network such as the Internet. It will be appreciated that the general aspects of this embodiment may be used with any computer game on which an avatar is used, for example, the principles of this embodiment may be used to communicate the physiological and emotional state of users in virtual 'worlds' or MMORPGs.

It will be appreciated that the computer program and game parameters used in computer blackjack, gambling and other games are well known in the art and will not be described herein.

FIG. 9 shows a game GUI (301) that provides an interface with the computer game Application Program Interface API. This GUI (301) is displayed on a display screen (10) and has images (303a-303c) of avatars representing other players (6a-6c) on the network. In turn the user (6) has an avatar (not shown) that is similarly displayed to the other players.

The GUI (301) also includes images of game items provided in the form of playing cards (305a-305d) held by each player. Each player has an image generation system (1) connected to the server running the program (300) via the user's computer system. The image generation system (1) provides bio-feedback (108) and eye-tracking (104) data to the server and this data (104, 108) is processed using eye-tracking, bio-feedback and image generation algorithms to generate an avatar image (other users' avatars are shown as 303a, 303b, 303c) representing the physiological state of the particular user as facial expressions, coloring or other indicators on the avatar image. The eye-tracking data is used to generate arrows (304b, 304c) indicating the viewing direction of the users (6a-6d), though in FIG. 9 arrows are only shown for users (6b) and (6c).

Online blackjack and other competitive games provide no way in which users can view the facial expressions, emotions and other physiological states of their competitors. In contrast, real games provide facial expressions and other body language as cues on the emotive state o a competitor. The embodiment shown in FIG. 9 similarly provides a visual representation of the physiological state of the user as well as indicating what the user is looking at.

Aspects of the present invention have been described by way of example only and it should be appreciated that modifications and additions may be made thereto without departing from the scope of the appended claims.

The invention claimed is:

1. An image generation system for generating an image, the image generation system including:
an eye-tracking system capable of determining a user's eye orientation and outputting a signal indicative of the eye orientation;
a bio-feedback sensor capable of detecting activity of one or more physiological functions of the user and outputting a signal indicative of the level of activity; and
a processor adapted to receive and process the output signals from the eye-tracking system and bio-feedback sensor; wherein the processor determines an image to be generated indicative of the signals from the eye-tracking system and bio-feedback sensor;
a first display for displaying the generated image;
a second display for presenting a first image to the user;
wherein the eye-tracking system is capable of determining one or more points of eye-fixation of a user on the first image, the processor determining an image to display on the first display indicative of the signals from the eye-tracking system and bio-feedback sensor.

2. An image generation system as claimed in claim 1, wherein the eye-tracking system is capable of detecting eye-movement of a user.

3. An image generation system as claimed in claim 1, wherein the processor processes the signal from the eye-tracking system to determine eye-fixation, eye-fixation being the time-duration in which a user's eyes are directed in one or more viewing directions from the detected eye-orientation.

4. An image generation system as claimed in claim 1, wherein the processor determines a location to display a part of the generated image from the output signal from the eye-tracking system.

5. An image generation system as claimed in claim 1, wherein the processor varies at least one parameter of a part of the image to be displayed on the first display from the output signal from the bio-feedback sensor.

6. An image generation system as claimed in claim 1, wherein the processor determines a sound to be generated from a speaker indicative of the signals from the eye-tracking system or the bio-feedback sensor.

7. An image generation system as claimed in claim 1, wherein the eye-tracking system and/or bio-feedback sensor are adapted to be substantially portable and capable of remotely transmitting a signal to the processor.

8. An image generation system as claimed in claim 1, wherein the eye-tracking system includes an oculometer capable of detecting the orientation of an eye.

9. An image generation system as claimed in claim 8, wherein the oculometer is movable on a mounting such that it may be aligned with a user's eyes.

10. An image generation system as claimed in claim 8, wherein the oculometer is automatically movable to maintain alignment with a user's eyes.

11. An image generation system as claimed in claim 8, wherein the oculometer is coupled to a user-location system, the user-location system capable of identifying the location or orientation of the user and determining the position of the user's eyes by extrapolating from the user location.

12. An image generation system as claimed in claim 1, wherein the bio-feedback sensor includes one or more sensors capable of measuring at least one of a user's galvanic skin response, heart-rate blood pressure, cerebral electric potential, skin temperature, muscle tension, heart-rate variability, blood-pressure variability, skin moisture.

13. An image generation system as claimed in claim 1, including a processor for each of the eye-tracking system and the bio-feedback sensor, said processors being programmed to process the output signals from the eye-tracking system and bio-feedback sensor for transfer to a digital computer, the digital computer including a processor capable of determining an image to be generated indicative of the signals from the eye-tracking system and bio-feedback sensor.

14. An image generation system as claimed in claim 1, wherein the processor determines a position of a part of the image to be displayed on the first display from the output signal from the eye-tracking system.

15. An image generation system as claimed in claim 1, wherein the processor determines a parameter of a part of the image to be displayed on the first display from the output signal from the eye-tracking system.

16. An image generation system as claimed in claim 1, wherein the processor determines a parameter of a part of the image to be displayed on the first display from the output signals from the eye-tracking system indicative of a level of saccade.

17. An image generation system as claimed in claim 1, wherein the image determined to be displayed on the first display is an at least partial copy or representation of the first image.

18. An image generation system as claimed in claim 17, wherein the image determined to be displayed on the first display is an at least partial copy or representation of a part of the first image corresponding to the user's eye-fixation on the first image.

19. An image generation system as claimed in claim 18, wherein the size of the part of the first image copied and displayed on the first display is dependant on the output signal from the eye-tracking system.

20. An image generation system as claimed in claim 1, wherein the second display includes a second display screen, the first image being displayed thereon.

21. An image generation system as claimed in claim 1, wherein the first and second displays are part of a single display.

22. An image generation system as claimed in claim 1, wherein the first image is a three-dimensional image of a virtual-reality environment and a control system is provided to navigate through the virtual-reality environment and change the first image.

23. An image generation system as claimed in claim 22, wherein the control system may include the eye-tracking system and bio-feedback sensor.

24. An image generation system as claimed in claim 1, wherein the processor is connected to the second display and programmed to present the first image as filtered, processed, distorted and/or rendered at least partially unclear.

25. An image generation system as claimed in claim 24, wherein the processor is programmed to vary at least one image parameter of a part of the first image to improve image clarity when the eye-tracking system detects the user looking at said part.

26. An image generation system as claimed in claim 1, wherein the processor determines a parameter of a part of the image to be displayed on the first display from the output signal from the bio-feedback sensors.

27. An image generation system as claimed in claim 26, wherein the size of the part of the image displayed on the first display is dependant on the output signal from the bio-feedback sensor.

28. An image generation system as claimed in claim 1, wherein the second display includes physical objects or images, the first image being formed therefrom.

29. An image generation system as claimed in claim 28, including an image capture device for capturing the first image as a digital image.

30. A communication system for allowing communication between two users at two separate user locations, the communication system including:
 a first image generation system, the first image generation system including:
  a first eye-tracking system capable of determining a first user eye orientation and outputting a signal indicative of the first user eye orientation;
  a first bio-feedback sensor capable of detecting activity of one or more physiological functions of the first user and outputting a signal indicative of the level of activity; and
  a first processor adapted to receive and process the output signals from the first eye-tracking system and first bio-feedback sensor; wherein the first processor determines an image to be generated indicative of the signals from the first eye-tracking system and first bio-feedback sensor;
  a first display;
  a second display for presenting a first image to the first user;
  wherein the first eye-tracking system is capable of determining one or more points of eye-fixation of the first user on the first image;
 a second image generation system, the second image generation system including:
  a second eye-tracking system capable of determining a second user eye orientation and outputting a signal indicative of the second user eye orientation;
  a second bio-feedback sensor capable of detecting activity of one or more physiological functions of the second user and outputting a signal indicative of the level of activity; and
  a second processor adapted to receive and process the output signals from the second eye-tracking system and second bio-feedback sensor; wherein the second processor determines an image to be generated indicative of the signals from the second eye-tracking system and second bio-feedback sensor;
  a further first display;
  a further second display for presenting a further first image to the second user;
  wherein the second eye-tracking system is capable of determining one or more points of eye-fixation of the second user on the further first image;
 wherein the first processor determines an image to display on the further first display indicative of the signals from the first eye-tracking system and first bio-feedback sensor;
 wherein the second processor determines an image to display on the first display indicative of the signals from the second eye-tracking system and second bio-feedback sensor.

31. The communication system of claim 30, wherein the first image generation system includes a first image capture device, the first image capture device providing a digital image for presentation on the further second display.

* * * * *